United States Patent [19]

DeJaco et al.

[11] Patent Number: 5,784,406

[45] Date of Patent: Jul. 21, 1998

[54] METHOD AND APPARATUS FOR OBJECTIVELY CHARACTERIZING COMMUNICATIONS LINK QUALITY

[75] Inventors: Andrew P. DeJaco, San Diego, Calif.; Serge D. Willenegger, Yverdon-les-bains, Switzerland; Paul E. Jacobs, La Jola, Calif.

[73] Assignee: Qualcom Incorporated, San Diego, Calif.

[21] Appl. No.: 496,817

[22] Filed: Jun. 29, 1995

[51] Int. Cl.$^6$ .............................. H04B 17/00; H04Q 1/20
[52] U.S. Cl. .................. 375/224; 375/227; 375/358; 370/249; 370/250; 379/5; 455/67.4
[58] Field of Search ......................... 375/224, 221, 375/222, 225, 226, 227, 358; 379/4, 5, 6, 22, 27, 29, 30; 370/13, 249, 250, 251, 252, 248; 371/20.3, 20.4, 20.5; 455/67.1, 67.3, 67.4, 67.6

[56] References Cited

U.S. PATENT DOCUMENTS

| | | | |
|---|---|---|---|
| 3,737,766 | 6/1973 | Lubarsky, Jr. | 324/57 R |
| 3,956,601 | 5/1976 | Harris et al. | 179/175.3 R |
| 4,443,661 | 4/1984 | Kubo | 179/2 EB |
| 4,768,203 | 8/1988 | Ingle | 375/10 |
| 4,845,735 | 7/1989 | Payne et al. | 379/5 |
| 4,903,323 | 2/1990 | Hendershot | 455/67 |
| 5,343,461 | 8/1994 | Barton et al. | 370/13 |
| 5,410,753 | 4/1995 | Szabo | 455/67.4 |
| 5,423,071 | 6/1995 | Hanninen | 455/67.3 |
| 5,425,076 | 6/1995 | Knippelmier | 379/27 |
| 5,428,821 | 6/1995 | Krisna et al. | 455/67.4 |
| 5,446,781 | 8/1995 | Lindstrom et al. | 379/27 |
| 5,471,649 | 11/1995 | Rees et al. | 455/67.4 |
| 5,475,711 | 12/1995 | Betts et al. | 375/222 |
| 5,515,398 | 5/1996 | Walsh et al. | 375/222 |

FOREIGN PATENT DOCUMENTS

| | | | |
|---|---|---|---|
| 2-134929 | 5/1990 | Japan | 455/67.4 |

*Primary Examiner*—Don N. Vo
*Attorney, Agent, or Firm*—Russell B. Miller; Sean English; Linli L. Golden

[57] ABSTRACT

A method and apparatus for characterizing a communications link. An apparatus is disclosed for performing a series of tests that measure delay time, frequency response, background noise, frame error rate and sample slipping and repetition measurements. A signal generator generates a series of signal optimally selected for the particular test. The generated signal is transmitted through the communication system and then sent back through the system by a loop back element remotely placed. The return signal is then analyzed by a monitor means.

23 Claims, 6 Drawing Sheets

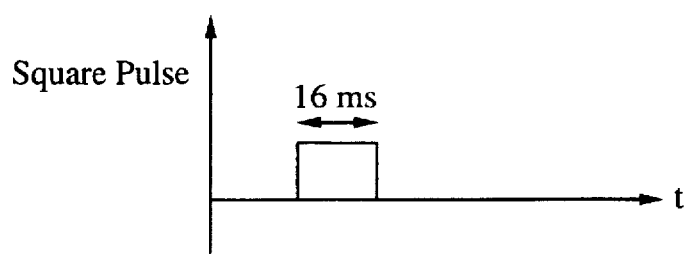
FIG. 2a
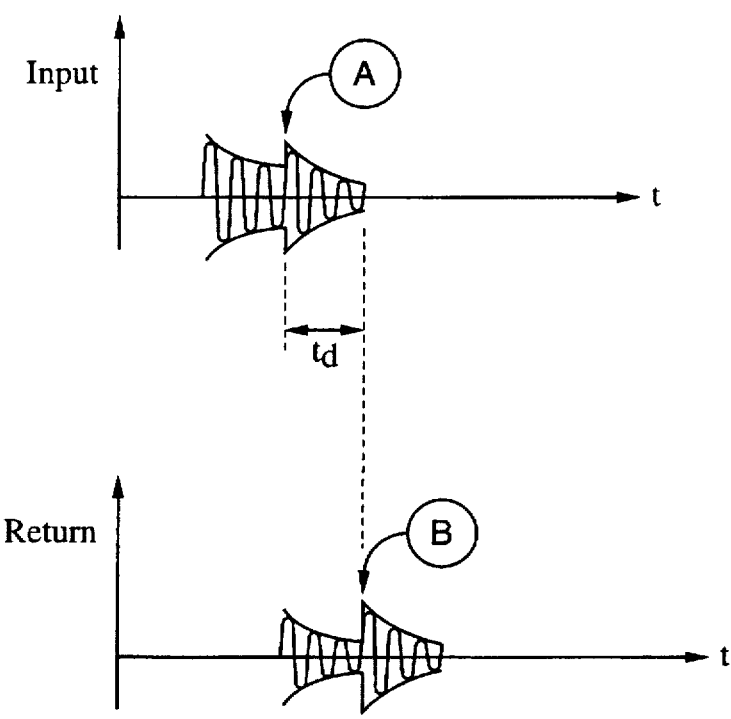
FIG. 2b
FIG. 2c

METHOD AND APPARATUS FOR OBJECTIVELY CHARACTERIZING COMMUNICATIONS LINK QUALITY

BACKGROUND OF THE INVENTION

I. Field of the Invention

The present invention relates to communication systems and, more particularly, to a novel and improved method and apparatus for evaluating the quality of transmission over digital communication channels.

II. Description of the Related Art

Communication systems have been developed to allow transmission of information signals from a source location to a physically distinct user destination. Both analog and digital methods have been used to transmit such information signals over communication channels linking the source and user locations. Digital methods tend to afford several advantages relative to analog techniques, including, for example, improved immunity to channel noise and interference, increased capacity, and improved security of communication through the use of encryption.

In transmitting an information signal from a source location over a communication channel, the information signal is first converted into a form suitable for efficient transmission over the channel. Conversion, or modulation, of the information signal involves varying a parameter of a carrier wave on the basis of the information signal in such a way that the spectrum of the resulting modulated carrier is confined within the channel bandwidth. At the user location the original message signal is replicated from a version of the modulated carrier received subsequent to propagation over the channel. Such replication is generally achieved by using an inverse of the modulation process employed by the source transmitter.

Modulation also facilitates multiple-access, i.e., the simultaneous transmission of several signals over a common channel. Multiple-access communication systems will often include a plurality of remote subscriber units requiring intermittent service of relatively short duration rather than continuous access to the communication channel. Systems designed to enable communication over brief periods of time with a set of subscriber units have been termed multiple access communication systems.

A particular type of multiple access communication system is known as a spread spectrum system. In spread spectrum systems, the modulation technique utilized results in a spreading of the transmitted signal over a wide frequency band within the communication channel. One type of multiple access spread spectrum system is a code division multiple access (CDMA) modulation system. Other multiple access communication system techniques, such as time division multiple access (TDMA), frequency division multiple access (FDMA) and AM modulation schemes such as amplitude companded single sideband are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention, the disclosure of which is incorporated by reference herein.

In the above-referenced U.S. Pat. No. 4,901,307, a multiple access technique is disclosed where a large number of mobile telephone system users each having a transceiver communicate through satellite repeaters or terrestrial base stations using CDMA spread spectrum communication signals. In using CDMA communications, the frequency spectrum can be reused multiple times thus permitting an increase in system user capacity. The use of CDMA results in a much higher spectral efficiency than can be achieved using other multiple access techniques. A further example of a CDMA communication system is disclosed in U.S. Pat. No. 5,103,459, entitled "SYSTEM AND METHOD FOR GENERATING SIGNAL WAVEFORMS IN A CDMA CELLULAR TELEPHONE SYSTEM", also assigned to the assignee of the present invention, the disclosure of which is incorporated by reference herein.

More particularly, communication in a CDMA system between a pair of locations is achieved by spreading each transmitted signal over the channel bandwidth by using a unique user spreading code. Specific transmitted signals are extracted from the communication channel by despreading the composite signal energy in the communication channel with the user spreading code associated with the transmitted signal to be extracted. The transmitted signal is divided into a number of "frames", each of which includes a specified number of information bits. It is generally possible to transmit the information bits within each frame at any one of a number of predetermined data rates.

Implementation of spread spectrum, e.g., CDMA, cellular systems capable of providing adequate service to a particular geographic region generally involves consideration of a number of factors bearing upon system performance. For example, it is generally necessary to consider the extent of the available frequency spectrum, as well as the potential for coordination with other nearby communication systems. In addition, constraints imposed by thermal noise and interference generated by the various subscriber units needs to be taken into consideration. Estimates of interference are of particular concern within CDMA systems, since power is transmitted by the subscriber units over the same bandwidth irrespective of location within the cellular coverage area.

Interference on the communication channels linking a particular base station and the subscriber units within a given cell can arise when neighboring cells use the same or an adjacent CDMA radio channel as those used within the given cell. In order to evaluate system performance under realistic conditions, a selected number of subscriber units may be deployed at various distances from multiple base stations as a means of estimating various levels of channel interference. During system deployment, the quality of signal transmission at various distances from a base station may be determined on the basis of qualitative characterization of the received signal by subscriber unit users. Various system parameters (e.g., transmitted power level) may then be adjusted in order to improve communication quality.

However, it is anticipated that quantitative measurement of the capability of a digital communication channel to carry particular types of information (e.g., variable or fixed-rate frame data) would enable more precise evaluation of system performance. That is, quantitative measurements of system performance would allow for accumulation of performance data more accurate than the subjective characterizations of received signal quality solicited from actual subscriber users. For example, subjective evaluations of signal quality do not allow for determination of transmission statistics (e.g., frame error rate at various data rates). In addition, qualitative estimation of signal quality does not allow for real-time detection of channel degradation giving rise to bit error rates in excess of a predetermined threshold. This capability would facilitate, for example, identification of particular frames of digital data as being so "corrupted" so as to be unusable if a desired level of accuracy is to be maintained.

In addition, in modern digital communications systems two other useful elements are echo cancellers and speech encoders. Echo cancellers reduce the annoying echo produced as a result of reflection of ones voice through the system. Speech encoders reduce the amount of data used to represent a speech signal.

Communication systems require the use of echo cancellers for a variety of reasons. One cause of echo in telephone networks is due to the use of a device that interfaces the two-wire and four-wire segments known as a hybrid. A typical long-distance telephone circuit can be described as being two-wire in the subscriber loop to the local hybrid, four-wire over the long-haul network to the distant hybrid, and then two-wire to the distant speaker.

Although, the use of hybrids facilitates long distance speech transmission, impedance mismatches at the hybrid cause echoes. The speech of the speaker A is reflected off the distant hybrid (the hybrid closest to the speaker B) in the telephone network back toward the speaker A, causing the speaker A to hear an annoying echo of his/her own voice. Network echo cancellers are thus used in the land-based telephone network to eliminate echoes caused by impedance mismatches at the hybrids and are typically located in the central office along with the hybrid. The echo canceller located closest to speaker A or B is thus used to cancel the echo caused by the hybrid at the other end of the call. An example of a method and apparatus for canceling network echo is described in detail in U.S. Pat. No. 5,307,405, entitled "NETWORK ECHO CANCELLER", assigned to the assignee of the present invention, of which the disclosure thereof is incorporated by reference herein.

Variable rate speech compression systems typically use some form of rate determination algorithm before encoding begins. The rate determination algorithm assigns a higher bit rate encoding scheme to segments of the audio signal in which speech is present and a lower rate encoding scheme for silent segments. In this way a lower average bit rate will be achieved while the voice quality of the reconstructed speech will remain high. Thus, to operate efficiently a variable rate speech coder requires a robust rate determination algorithm that can distinguish speech from silence in a variety of background noise environments.

One such variable rate speech compression system or variable rate vocoder is disclosed in U.S. Pat. No. 5,414,796, entitled "Variable Rate Vocoder" and assigned to the assignee of the present invention, the disclosure of which is incorporated by reference. In this particular implementation of a variable rate vocoder, input speech is encoded using Code Excited Linear Predictive Coding (CELP) techniques at one of several rates as determined by the level of speech activity. The level of speech activity is determined from the energy in the input audio samples which may contain background noise in addition to voiced speech. In order for the vocoder to provide high quality voice encoding over varying levels of background noise, an adaptively adjusting threshold technique is required to compensate for the effect of background noise on the rate decision algorithm.

SUMMARY OF THE INVENTION

The present invention provides a system for quantitatively evaluating the quality of communication channels within a digital communication system. In an exemplary embodiment, the present invention may be incorporated within a digital cellular communication system in which information is exchanged over spread spectrum communication channels, among a plurality of mobile users, via at least one cell-site.

The present invention contemplates testing a wireless communication system by transmitting test signals from a landline connection through the public switched telephone network (PSTN) and through the wireless channel. The test sequence of digital data transmitted over the communication channel is received at a receiving station, within which is also generated a replica of the test sequence of digital data.

The present invention details methods by which to accurately characterize the transmission delay in the communication link, the frequency response of the communication link, the energy of the noise on the communication link, the frame error rate of the communication link and sample slipping that occurs on the communication link. Described herein are the optimal test sequences for characterizing the link and the method of analyzing the return data.

One of the important distinctions of the present invention is that it is non-intrusive on the communications link. That is to say, the tests conducted appear to all of the communications systems elements simply as another call. The method and system of the present invention requires no modifications or special test configurations of any of the equipment in the communications link being tested.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 2a–2c are illustrations of the input signal and return signal used in the exemplary embodiment for performing the time delay measurement;

DETAILED DESCRIPTION OF THE PREFERRED EMBODIMENTS

Figure 1:
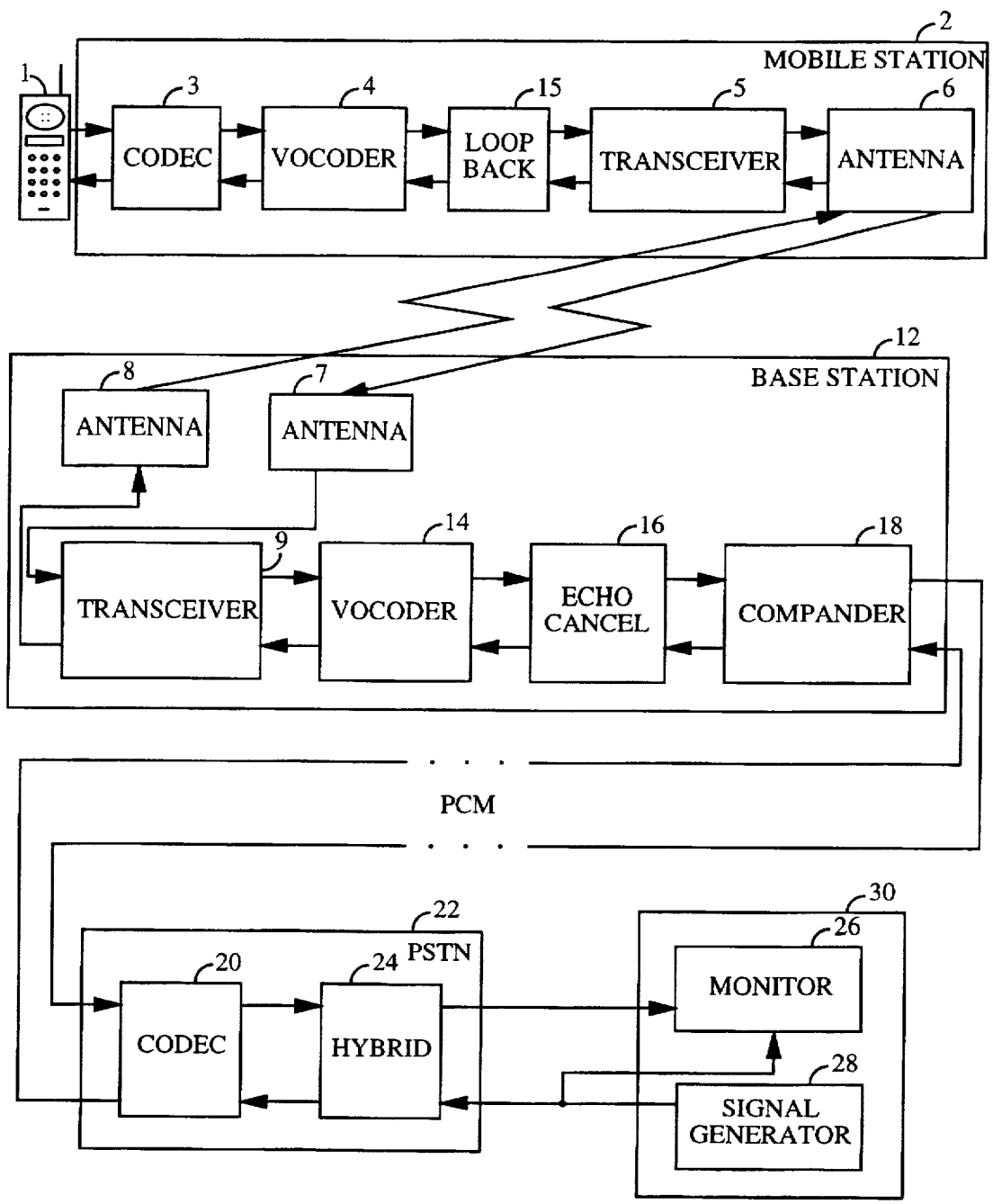
FIG. 1 is a block diagram illustrating the present invention in an exemplary implementation.

Referring to FIG. 1, the present invention is embodied in characterization system 30 which comprises signal generator 28 and monitor 26. In the exemplary embodiment, characterization system 30 is implemented in a microprocessor or micro-controller which is programmed to generate digital signals as described in detail below and which is further programmed to perform analysis upon return digital signals. Characterization system 30 operates in conjunction with loop back element 15 provided in mobile station 2. In the exemplary embodiment, loop back element 15 is implemented in a microprocessor or micro-controller located in mobile station 2.

In the exemplary embodiment, signal generator 28 provides digital signals directly through a T1 line to public switched telephone network (PSTN) 22. Similarly in the exemplary embodiment, monitor 26 receives the return signal in digital form by means of a T1 line. In an alternative embodiment, the digital signals from signal generator 28 could be converted to analog signals by means of a digital to analog converter (not shown) and sent to PSTN 22 on an analog line and an analog return signal could be converted to digital signals by means of an analog to digital converter (not shown) then provided to monitor 26.

In the exemplary embodiment, monitor 26 and signal generator 28 are implemented in a microprocessor or microcontroller wherein all measurements and generated signals are digital. In an alternative embodiment, the signals could be generated by analog signal generators and monitored by analog signal measurement apparatus. In the exemplary embodiment, signal generator 28 provides digital signals into transmission frames.

The test signal from signal generator 28 is provide to hybrid 24 which converts the two line signal to a four line signal. Hybrid 24 is typically located in a telephone system's central office. In the exemplary embodiment, data is transmitted in frames of a predetermined duration. In the exemplary embodiment, 20 ms. frames of 160 samples each are transmitted through the system.

The signal is then provided to codec 20 which converts the analog signal to a linear digital signal. This digital signal is then converted to a µ-law signal. The pulse code modulated (PCM) signal from codec 20 is then provided by PSTN 22 to base station 12. The signal is provided to compander 18 which converts the companded signal to a linear representation which then provides the linear signal to echo canceller 16. Echo canceller 16 enhances the perceptual sound quality of transmitted signals by canceling the echo. In the exemplary embodiment, echo canceller 16 is a network echo canceller as described in U.S. Pat. No. 5,307,405. The echo canceled signal is then provided to vocoder 14 where it is encoded. In the exemplary embodiment, vocoder 14 is a variable rate code excited linear prediction (CELP) coder, the implementation of which is detailed in the aforementioned U.S. Pat. No. 5,414,796.

The encoded signal is then provided to transceiver 9. Transceiver 9 encodes the signal for error correction and detection purposes, modulates and upconverts the signal and provides the signal to antenna (ANT) 8 for broadcast. In the exemplary embodiment, transceiver 9 is a code division multiple access (CDMA) transceiver, the design and implementation of which are described in detail in the aforementioned U.S. Pat. Nos. 4,901,301 and 5,103,459. The broadcast signal is received at mobile station antenna (ANT) 6 and provided to transceiver 5.

Transceiver 5 downconverts and de-modulates the received signal and performs error correction and detection operations upon the received signal. In the exemplary embodiment, transceiver 9 is a code division multiple access (CDMA) transceiver, the design and implementation of which are described in the aforementioned U.S. Pat. Nos. 4,901,301 and 5,103,459.

The signal is passed through loop back element 15 to vocoder 4 where the signal is decoded then provided to codec 3 where it is converted to an analog signal and provided to handset 1 where it provided to the user of mobile station 2. In the reverse direction, handset 1 converts acoustic signals to electric signals which are in turn provided to codec 3 where they are converted to digital signals, and then encoded by vocoder 4. Vocoder 4 then provides the encoded signal through loop back element 15 to transceiver 5 to antenna 6. When tests are not being conducted, loop back element 15 is invisible to the communication system.

In the present invention, when system characterization tests are being conducted, the signal received by transceiver 5 is provided to loop back element 15, and provided directly back to transceiver 5, which re-encodes, modulates and upconverts the signal and provides the signal to antenna 6 for broadcast. Loop back element 15 can be activated either by the mobile station user by means of a switch (not shown) provided in mobile station 2 or it can be activated remotely by sending a predetermined data sequence from characterization system 30. In the exemplary embodiment, loop back element 15 is implemented in a microprocessor or microcontroller in mobile station 2.

The broadcast signal is received at antenna (ANT) 7 of base station 12 and provided to transceiver 9 where it is downconverted, demodulated and error correction and detection decoded. The signal is then provided to vocoder 14 which decodes the signal and provides it to echo canceller 16. In the exemplary embodiment, echo canceller 16 is a network echo canceller as described in detail in aforementioned U.S. Pat. No. 5,307,405. The echo canceled signal is then provided to compander 18 where the µ-law signal is converted and transmitted as a pulse code modulated (PCM) signal back to PSTN 22. At codec 20 the µ-law signal is converted to an analog signal which is provided to hybrid 24. This analog signal is then provided through hybrid 24 to monitor 26 of characterization system 30.

In the exemplary embodiment, the signal provided from PSTN 22 is a digital signal transmitted through a digital T1 link to characterization system 30. In an alternative embodiment, the return signal is provided through an analog link to characterization system 30 and converted into a digital signal at characterization system 30. At monitor 26, the return signal is analyzed to characterize the objective quality of the communication system. In the exemplary embodiment, monitor 26 is implemented in a microprocessor or micro-controller which is programmed to perform the analysis of the return signals as described below.

The first characterization performed by the present invention measures the round trip delay of a signal. FIG. 2a illustrates the square pulse that is bandpass filtered to provide the input signal for the delay measurement test as illustrated in FIG. 2b. FIG. 2b illustrates the bandpass filtered square pulse generated by signal generator 28. In the exemplary embodiment the square pulse is 16 ms. long and is filtered by a bandpass filter with a low frequency cutoff of 1000 Hz and a high frequency cutoff of 3000 Hz.

In the exemplary embodiment, this signal is digitally generated by signal generator 28. In the exemplary embodiment, this signal is generated by a microprocessor programmed to generate such a signal, as is well known in the art. Thus, in the exemplary embodiment, signal generator 28 provides the appropriate digital samples to PSTN 22. The reason behind bandpass filtering of the input square wave is that the circuitry of PSTN 22 bandpass filters signals that pass through it. If the input signal is not prefiltered before being provided to the PSTN the correlation of the input and return signals in monitor 26 will suffer in precision.

In the exemplary embodiment, the delay time ($t_d$) is measured as the time between the time of transmission of the second peak (Point A of FIG. 2b) in the input signal, which results from the filtering of the falling edge of the square pulse of FIG. 2a and the time of reception of the second peak of the return signal (Point B of FIG. 2c). The delay time ($t_d$) may be defined by the following equation:

$$t_d = t_B - t_A, \quad (1)$$

where $t_B$ is the time of arrival of the second peak of the return signal and $t_A$ is the time of transmission of the second peak of the input signal. The reason for the measurements being based upon the second peaks is that automatic gain control (AGC) (not shown) in vocoder 14 takes time to adapt to the change of signal strength in the leading edge of the pulse thus the second peak is stronger and more easily distinguished and correlated.

Figure 3:
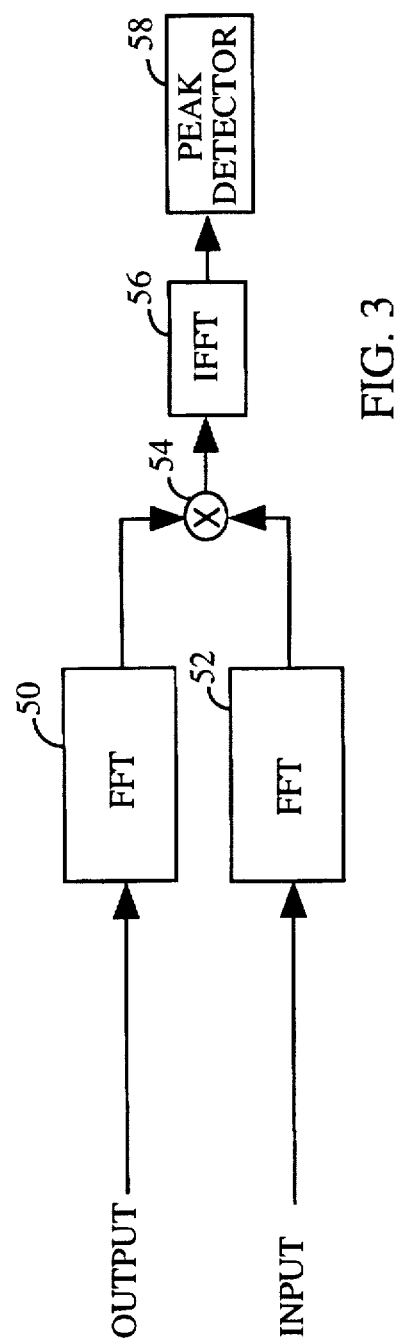
FIG. 3 is a block diagram illustrating the apparatus used for analyzing the time delay measurement.

FIG. 3 illustrates the apparatus used for analyzing the time delay that operates within monitor 26. Though the apparatus for correlating the signal out of signal generator 28 and the return signal is illustrated schematically in FIG. 3, it should be noted that all of these operations in the exemplary embodiment are performed within a microprocessor programmed to perform these operations, as is well know in the art.

The input signal provided by signal generator 28 is provided to fast Fourier transform (FFT) element 52 which computes the Fourier transform of the input signal. The return signal is provided to FFT element 50. The Fourier transform of the input signal and the Fourier transform of the return signal are provided to multiplier 54. The two signals are multiplied and their product is provided to inverse fast Fourier transform (IFFT) element 56. IFFT element 56 takes the inverse Fourier transform of the signal out of multiplier 54 and provides that signal to peak detector 58. Peak detector 58 analyzes the signal provided by IFFT element 56 and identifies a peak in the signal.

This peak identifies the round trip delay of the signal which is the convolution of the input signal and the output signal. In the exemplary embodiment, FFT elements 50 and 52 take 4000 point FFT's of the respective signals. The number of points selected for the FFT sufficient must be sufficient to cover all possible delays. In the exemplary embodiment the typical round trip delay is approximately 200 ms., so 4000 covering 500 milliseconds at a 8 KHz sampling rate is more than sufficient. In an alternative embodiment, the two signals can be convolved directly or a matched filter may be used to compute the correlation of the two signals.

Depending on how accurate one needs the measurement to be, the test may be repeated several times. In the exemplary embodiment, the square pulse is provided at different positions within the transmitted frame. There are two reasons which make repeating the measurement desirable. First, noise in the communication system can cause glitches in the output signal which can cause errors in measurement. The second reason to repeat the test is because of the possibility of frame erasures. In the exemplary embodiment, 20 ms. frames of 160 samples each are transmitted through the system. In the exemplary embodiment, the delay test is repeated 16 times, once every 10 symbols.

Figure 4A:
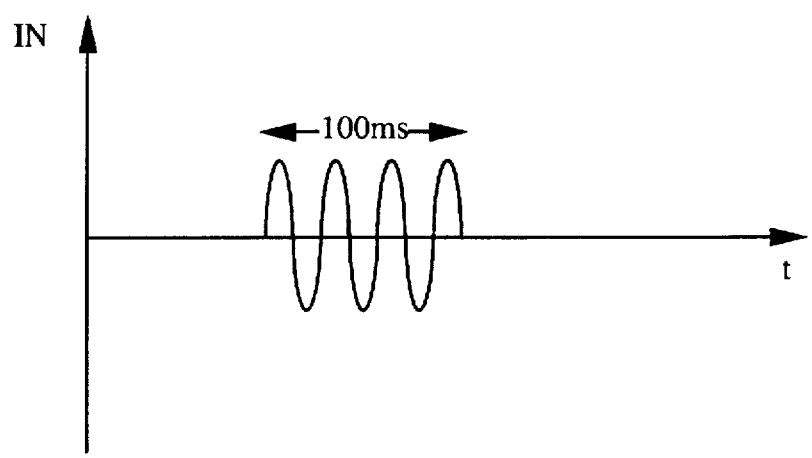
FIGS. 4a–4c are illustrations of the signals of the frequency response test.

The next characterization performed by the present invention is a frequency response test. FIG. 4a illustrates the input signal generated by signal generator 28 for the frequency response measurement. In the exemplary embodiment, the test signal is a sine wave or tone of a fixed duration. As described previously, in the exemplary embodiment, signal generator 28 is implemented in a microprocessor programmed to generate the tones for the frequency response test. The microprocessor may be programmed to generate the tones or may simply retrieve the frequency response test signals from memory within the microprocessor.

The maximum duration of the tone ($t_{max}$) is:

$$t_{max} = t_d - t_{NE}, \quad (2)$$

where $t_d$ is the round trip delay described earlier and $t_{NE}$ is the near end delay which is the round trip time of a signal from generator 28 reflected by hybrid 24 back to monitor 26. In the exemplary embodiment, the sine wave is of 100 ms. duration.

Figure 4B:
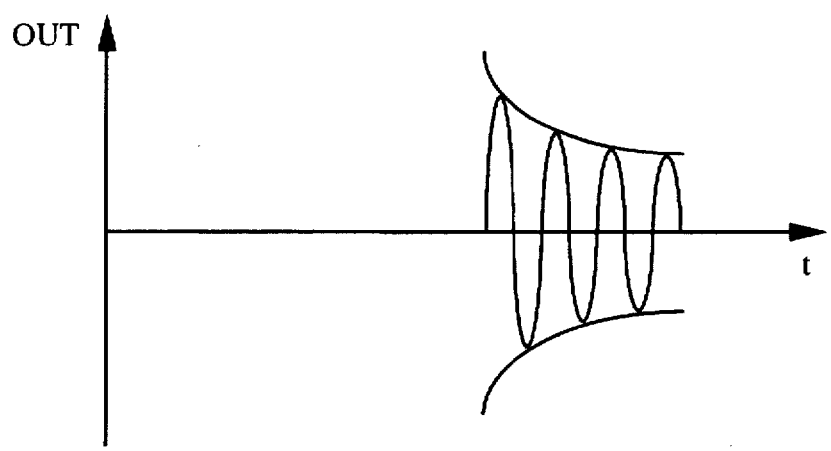
Figure 4C:
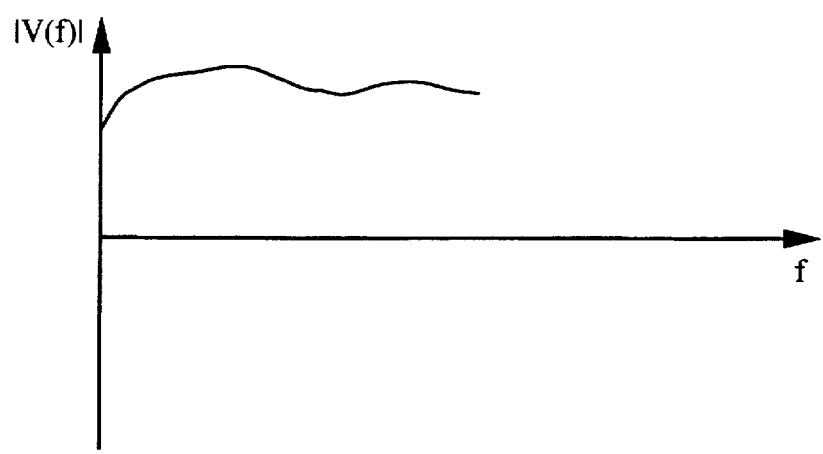

The tone signal is provide by signal generator 28 through PSTN 22 to base station 12 where it is broadcast to mobile station 2 and received and retransmitted as described previously. FIG. 4b illustrates the signal received at monitor 26. Vocoder 14 introduces distortion into this signal. FIG. 4c illustrates the frequency response of vocoder 14 independent from any other effects of the communications link. In the exemplary embodiment, the distortion introduced by vocoder 14 is removed from the received signal in the computation of the frequency response. The frequency response of the link characterized at the test frequency is the ratio between the energy of signal received at monitor 26 with the frequency response of vocoder 14 removed and the energy of the signal provided by signal generator 28.

In the exemplary embodiment, this test is performed every 100 Hz in the range from 100 Hz to 3900 Hz. In the exemplary embodiment, the test is repeated at each test frequency because of the possibility of frame erasures.

The next test conducted by the present invention is a noise energy test. In this test, no signal is sent by signal generator 28 and monitor 26 measures the energy of the return signal. In the exemplary embodiment, monitor 26 simply examines the values of the digital data in the frames of the return signal. In an alternative embodiment, the return signal could be an analog signal and characterization system 30 could include an analog to digital converter or monitor 26 could be an analog sound energy measurement device, the design and implementation of which are well known in the art.

The next test conducted by the present invention measures the frame error rate of the communication link. In the exemplary embodiment, when a frame erasure occurs, vocoder 14 re-transmits the last previous good frame. In the exemplary embodiment, signal generator 28 provides 10 ms. tones that are centered within the 20 ms. frames transmitted by the communication system as illustrated in FIG. 8a. These tones are sent in a predetermined pattern and then that pattern is analyzed at monitor 26 to determine whether it is the same pattern as was sent by signal generator 28. The number of mismatches in the pattern equals the number of frame erasures on the combined forward and reverse links.

In the exemplary embodiment, generator 28 is implemented in a microprocessor programmed to provide the 10 ms. tones. The values of the digital data can either be generated by signal generator 28 or can be retrieved from a memory element. Alternatively, signal generator 28 can be an analog frequency generator, the design and implementation of which are well known in the art. In the exemplary embodiment, monitor 26 is implemented in a microprocessor programmed to determine whether the return frames are indicative of frame erasures by examining the pattern of the tones in the return frames. It is envisioned that characterization system 30 maintains a running record of the frame error rate statistics. Data base methods for maintaining such statistics are well known in the art.

Figure 5A:
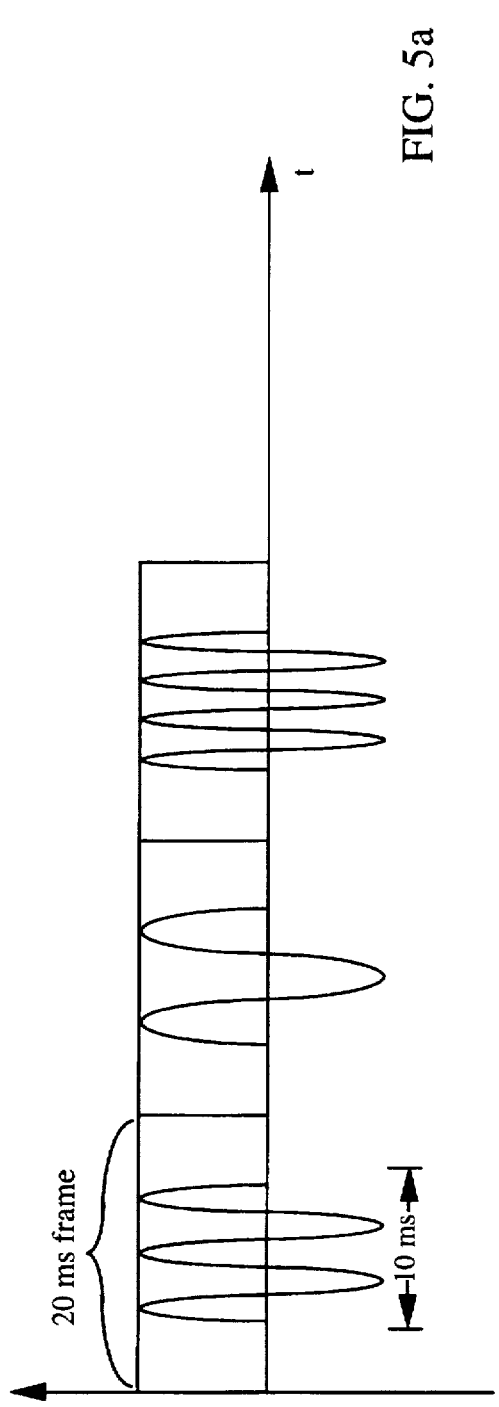
FIGS. 5a–5b are illustrations of the signals of the frame error rate (FER) test.
Figure 5B:
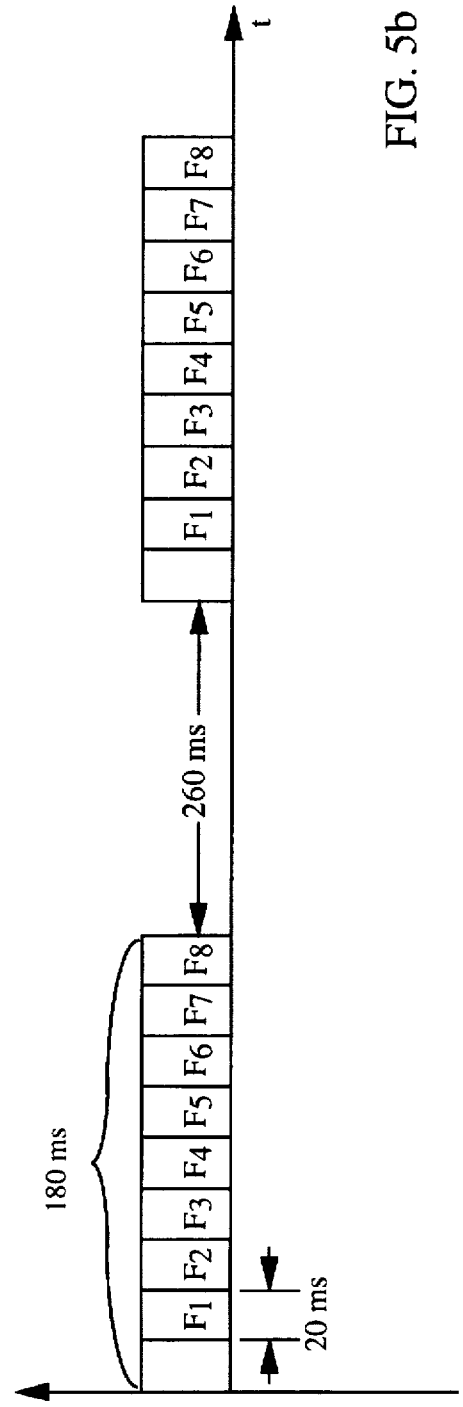

A string of tones are transmitted by signal generator 28 and then a pause is provided as illustrated in FIG. 5b. The series of tones must not have a duration ($t_{max}$) greater than the round trip delay $t_d$ less the near end delay (equation 2), to prevent the effects of double talk at echo canceller 16 and the near end echo from hybrid 24 from interfering with the test. The period of silence must be greater than the duration of the tones plus the near end delay or the round trip delay whichever is the greater. These tones are provided directly from signal generator 28 to monitor 26 along with the return signal for comparison.

In an improved embodiment, loop back element 15 provides a predetermined tone upon reception of a frame erasure. This predetermined tone would be transmitted back to the monitor 26. By doing this, monitor 26 could distinguish between those errors that occur on the forward link (signals transmitted from base station 12 to mobile station 2) and those frame erasure that occur on the reverse link (signals transmitted from mobile station 2 to base station 12).

Figure 6A:
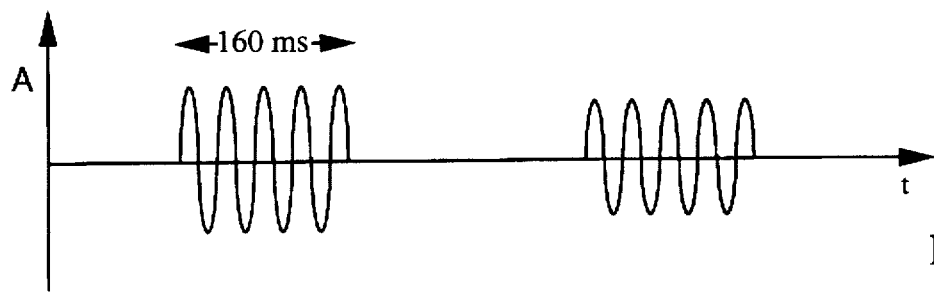
FIGS. 6a–6d are illustrations of the signal of the sample slip and repetition test.

The last test performed by the present invention measures and characterizes sample slips and repetitions that result lack of synchronization between PSTN 22 and base station 12. FIG. 6a illustrates the signals generated by signal generator 28 to characterize the sample slipping and repetitions of the link. As described previously, the duration of the tone must not exceed the round trip delay less the near end echo delay to prevent the effects of double talk at echo canceller 16 and the near end echo from hybrid 24. It should be noted that it is also possible to provide an echo canceller in front of monitor 26 so that the near end echo is no longer of concern. In the exemplary embodiment, the tone duration is 160 ms.

Figure 6B:
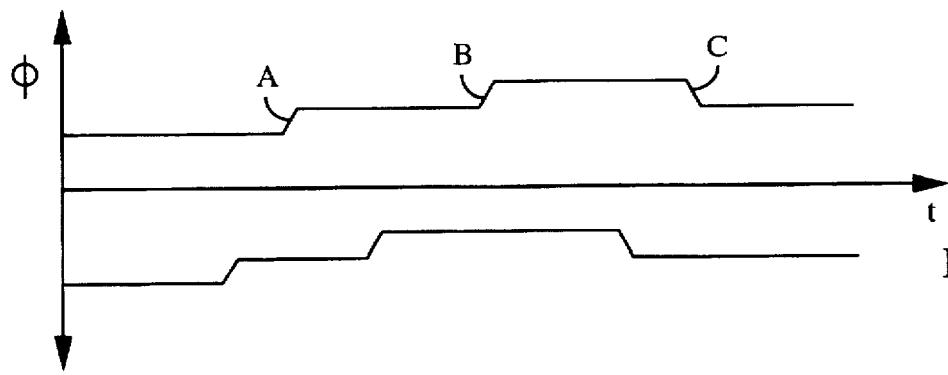

Monitor 26 using phase detection circuitry monitors the phase of the return signal. In the exemplary embodiment, monitor 26 is implemented in a microprocessor and performs the analysis of the phase changes by means of digital algorithms that are well known in the art. Shifts in phase indicate sample slips or repetitions. When the phase increases it indicates a sample slip as indicated by points A and B of FIG. 6b. When the phase decreases as designated by point C, this indicates a sample repetition.

Figure 6C:
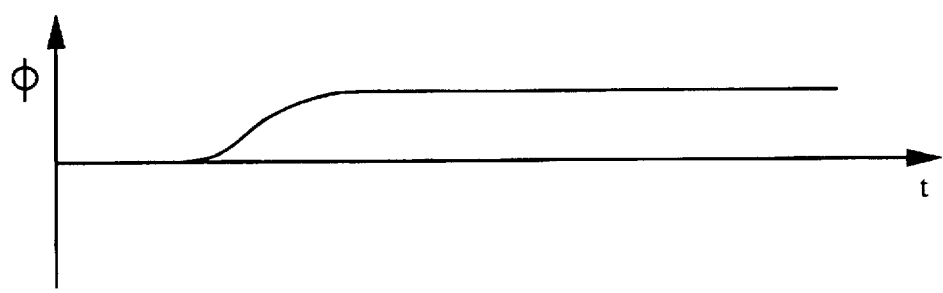
Figure 6D:
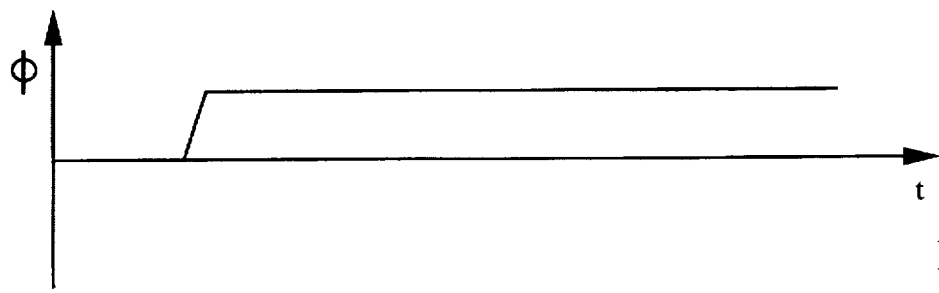

Furthermore, the present invention can distinguish between those slips that occur on the forward link from those that occur on the reverse link. Forward link slips or repetitions have a more gradual increase in the phase change whereas reverse link slips and repetitions are more abrupt. FIG. 6c provides a example of the type of phase change one would expect of a forward link slip whereas FIG. 6d illustrates the type of phase change that one would expect to see resulting from a reverse link slip or repetition. Thus, the present invention can distinguish between sample slips and repetitions that occur on the forward link from those that occur on the reverse link.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. An apparatus for characterizing a communication system, comprising:

signal generator means for generating a selected input signal of a predetermined plurality of test signals for transmission in a forward direction over a communication link of said communication system, said input signal for determining a particular quantitative characterization of the quality of the communication link;

a mobile station including a transceiver for receiving the input signal, the transceiver being connected to a loopback element, the loopback element sending the input signal back through the transceiver prior to decoding the signal to thereby produce a return signal; and monitor means for receiving the return signal having propagated in a reverse direction over said communication link and for analyzing said return signal to derive said particular quantitative characterization of the quality of said communication link.

2. The apparatus of claim 1 wherein said monitor means is also for receiving said input signal.

3. The apparatus of claim 1 wherein said input signal is a time delay measurement signal.

4. The apparatus of claim 3 wherein said time delay measurement signal is a bandpass filtered square pulse.

5. The apparatus of claim 4 wherein said bandpass filtered square pulse is filtered by a bandpass filter of a passband less than the passband of a public switching telephone network of said communication system.

6. The apparatus of claim 5 wherein said bandpass filtered square pulse is filtered by a bandpass filter from 1000 Hz to 3000 Hz.

7. The apparatus of claim 1 wherein said input signal is at least one frequency response test signal.

8. The apparatus of claim 1 wherein said input signal is a noise measurement signal.

9. The apparatus of claim 1 wherein said input signal is a frame error rate measurement signal.

10. The apparatus of claim 1 wherein said input signal is a sample slip measurement signal.

11. The apparatus of claim 10 wherein said sample slip measurement signal is a tone and wherein said monitor means measures the phase of said return signal.

12. The apparatus of claim 1 wherein said monitor means includes means for analyzing a frequency domain representation of said return signal.

13. The apparatus of claim 12 wherein said monitor means includes means for comparing said frequency domain representation of said return signal to a frequency domain representation of said input signal.

14. A means for characterizing a communication system, comprising:

signal generator means for generating an input signal for transmission through said communication system wherein said input signal is at least one frequency response test signal having at least one tone signal of a predetermined duration, the predetermined duration being less than a maximum round trip delay of the frequency response test signal less a near end echo delay; and monitor means for receiving a return signal and for analyzing said return signal to characterize link quality of said communication system.

15. A means for characterizing a communication system, comprising:

signal generator means for generating an input signal for transmission through said communication system wherein said input signal is at least one frequency response test signal; and monitor means for receiving a return signal and for analyzing said return signal to characterize link quality of said communication system wherein said monitor means subtracts distortion generated by a vocoder from said return signal and compares said return signal less distortion generated by said vocoder with said input test signal.

16. An apparatus for characterizing a communication system, comprising:

signal generator means for generating an input signal for transmission through said communication system wherein said input signal is a frame error rate measurement signal having a train of tones of a predetermined pattern; and monitor means for receiving a return signal and for analyzing said return signal to characterize link quality of said communication system wherein said monitor means compares said return signal against said predetermined pattern to determine the presence of frame errors.

17. The apparatus of claim 16 wherein said apparatus further comprises a loop back means for providing a predetermined tone indicative of a forward link frame error.

18. In a cellular communication system in which at least one mobile unit is in communication with a base station coupled to a switched telephone network, a system for objectively characterizing communication link quality comprising:

means for generating a selected input test signal for determining a particular quantitative characterization of said communication link quality;

means for transmitting said input test signal through said switched telephone network to said base station, said base station including means for transmitting said input test signal to said at least one mobile unit over a wireless communication channel; and monitor means for receiving a return signal produced at said at least one mobile unit in response to said input signal, and for analyzing said return signal to determine said particular quantitative characterization.

19. The apparatus of claim 18 wherein said monitor means includes means for analyzing a frequency domain representation of said return signal.

20. The apparatus of claim 19 wherein said monitor means includes means for comparing said frequency domain representation of said return signal to a frequency domain representation of said input signal.

21. The apparatus of claim 18 wherein said mobile unit includes a transmitter, a receiver, and a loopback element for electrically coupling an electrical representation of said input signal from said receiver to said transmitter.

22. A method for characterizing link quality of a communication system including a base station coupled to a switched telephone network and at least one mobile unit in wireless communication with the base station, said method comprising the steps of:

generating a selected input test signal through the switched telephone network to the base station for transmission through said communication system to the mobile unit said input signal for determining a particular quantitative characteristic of the signal transmission quality; and receiving from the mobile unit a return signal derived from said input signal, and analyzing a predetermined parameter of said return signal related to at least one said particular quantitative characteristic of said signal transmission quality through said communication system.

23. The method of claim 22 further including the step of generating said return signal by looping back said input signal at a remote location within said communication system.

* * * * *